June 10, 1941.  S. L. ST. JOHN  2,244,971
DECORTICATING METHOD AND APPARATUS
Filed July 21, 1939  7 Sheets-Sheet 3
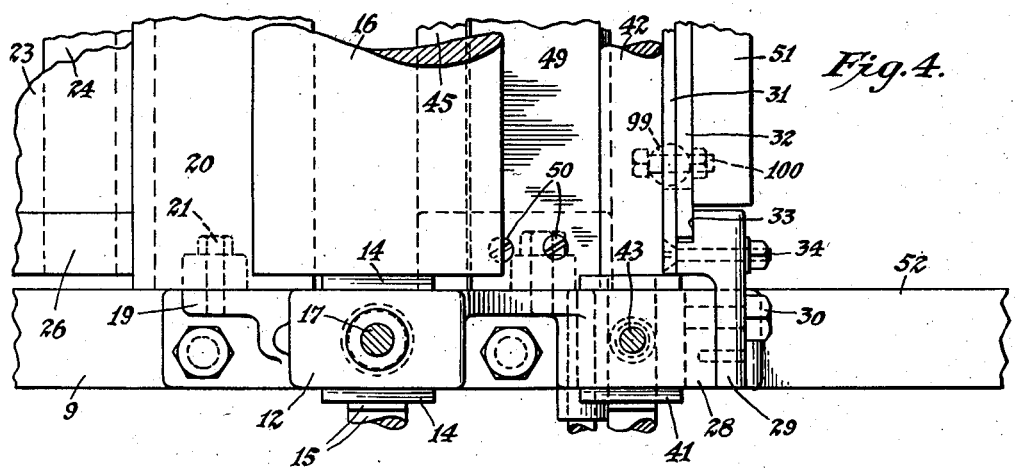
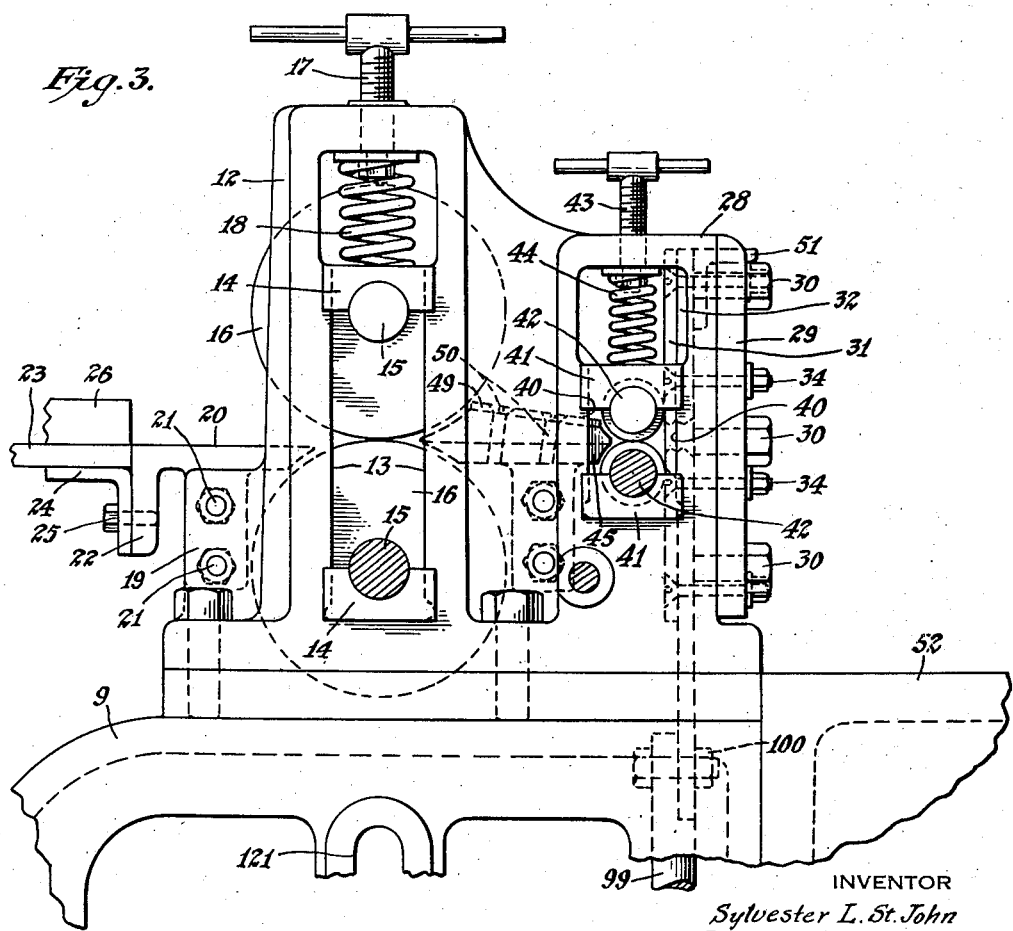
INVENTOR
Sylvester L. St. John
BY
ATTORNEY June 10, 1941.  S. L. ST. JOHN  2,244,971
DECORTICATING METHOD AND APPARATUS
Filed July 21, 1939  7 Sheets-Sheet 4

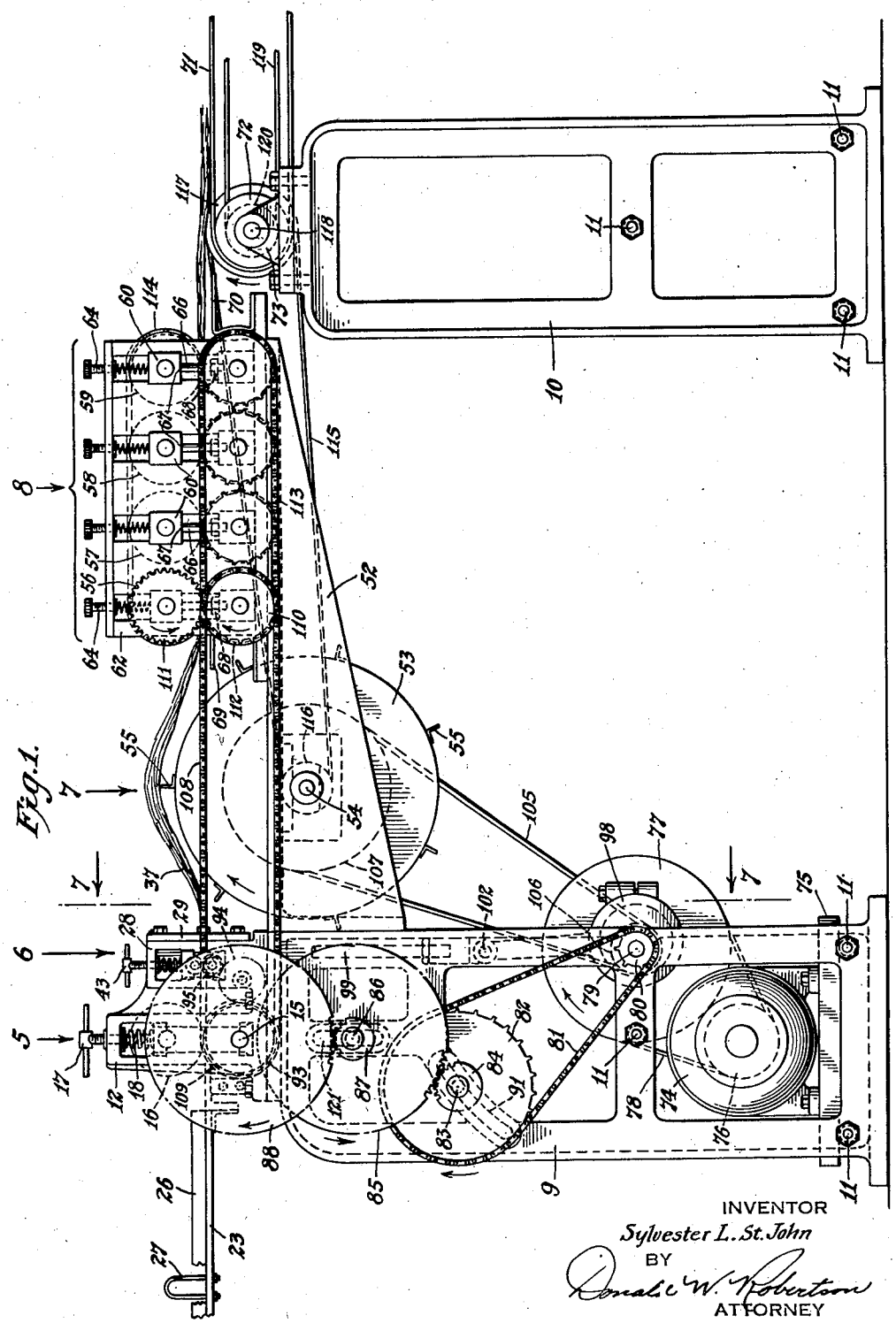

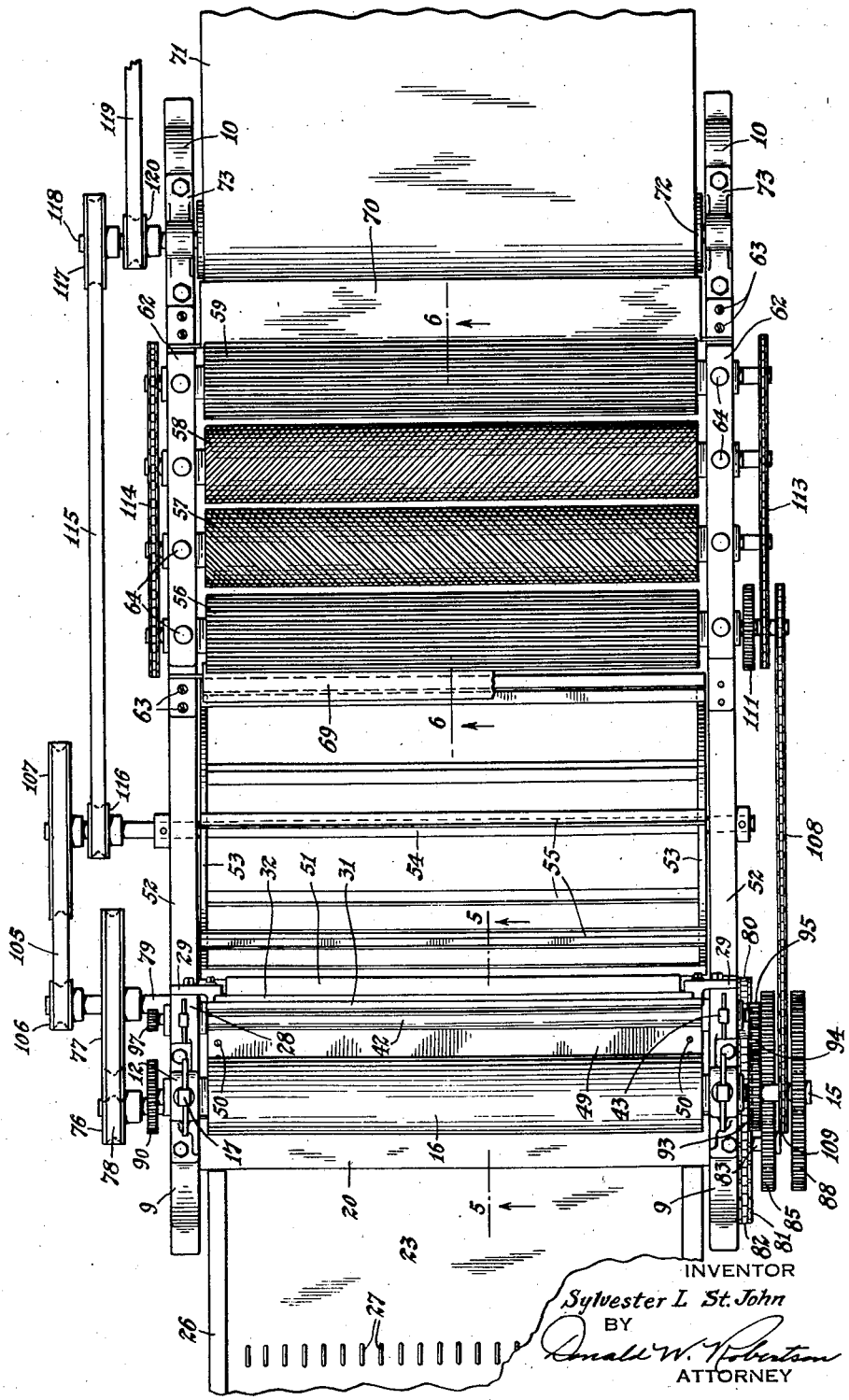

INVENTOR
Sylvester L. St. John
BY
Donald W. Robertson
ATTORNEY

June 10, 1941.　　　S. L. ST. JOHN　　　2,244,971
DECORTICATING METHOD AND APPARATUS
Filed July 21, 1939　　　7 Sheets-Sheet 7

INVENTOR
Sylvester L. St. John
BY
Donald W. Robertson
ATTORNEY

Patented June 10, 1941

2,244,971

UNITED STATES PATENT OFFICE 2,244,971

DECORTICATING METHOD AND APPARATUS

Sylvester L. St. John, Mansfield, Mass.

Application July 21, 1939, Serial No. 285,640

37 Claims. (Cl. 19—21)

The invention relates to method and means for decorticating ramie (Urtica nivea) and other fiber bearing plants.

The strength, luster, and other qualities of ramie which make it desirable for many purposes have long been recognized. It is also well known that ramie can be grown successfully in the Gulf Coast States, thus offering a promise of profits to the grower as well as to the manufacturer. In recognition of these favorable circumstances, large sums of money have been expended in attempts to establish a ramie industry in this country. These enterprises have not been successful, however. Probably one of the chief reasons for their failure has been the difficulty and expense of separating the fiber from the stalk. In China, the ribbons containing the fiber are stripped from the stalk and scraped by hand, producing what is known as China-grass. In order to compete successfully with imported China-grass, it appears to be necessary to perfect a low-cost mechanical method of separating the fibers from the stalk.

The problem thus presented has attracted much attention, and many attempts have been made to perfect a machine capable of performing the stripping operation. These attempts have not been attended with any substantial degree of commercial success, however. One method which has been devised consists in running the stalks through serrated or corrugated rolls to break up the woody portion of the stalk, after which the wood is separated from the fiber by passing the stalk through or over a beater. The corrugated rolls of such a machine injure the fiber, however, and may even cut much of the fiber into short lengths, which is undesirable and reduces the value and utility of the product. Other methods fail to effect sufficiently complete separation of the woody portions, or fail to act on the entire length of the stalk so that the butt-ends pass through the machine without being acted on by the beater. It is an object of my invention to provide a method and means for mechanically separating the fiber from the rest of the stalk which will overcome these and other disadvantages of methods heretofore devised.

A general object of my invention is to provide an improved method and apparatus for decorticating ramie and other fiber bearing plants.

More specifically, it is an object of my invention to provide a method of mechanically decorticating without injuring the fiber, and to produce what is known as "long line" fiber.

A further object of the invention is to provide decorticating apparatus which is inexpensive to operate, and which effects more complete separation of the fibers and woody matter.

Other objects and advantages will appear as the description proceeds.

In the drawings I have illustrated certain preferred embodiments of the apparatus aspects of my invention. Fig. 1 is a side elevational view of one form of apparatus, showing the general arrangement thereof and the progress of a stalk of ramie through the machine. Fig. 2 is a plan view of the same apparatus.

Figs. 3 and 4 are enlarged detail views of a portion of the same apparatus, illustrating the crushing rolls, feed rolls, and breaker bars, Fig. 3 being a side elevational view and Fig. 4 a fragmentary plan view of these elements.

Figs. 5 and 6 are enlarged vertical sectional views taken, respectively, on the lines 5—5 and 6—6 of Fig. 2.

Figure 9:
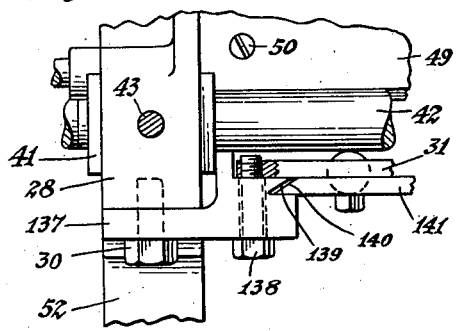
Figure 10:
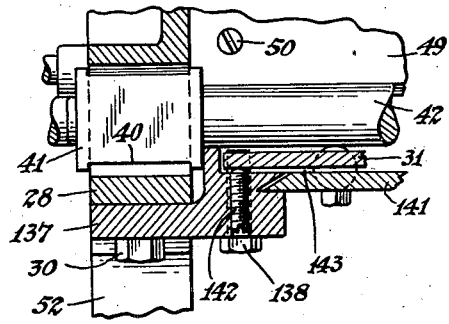
Figure 11:
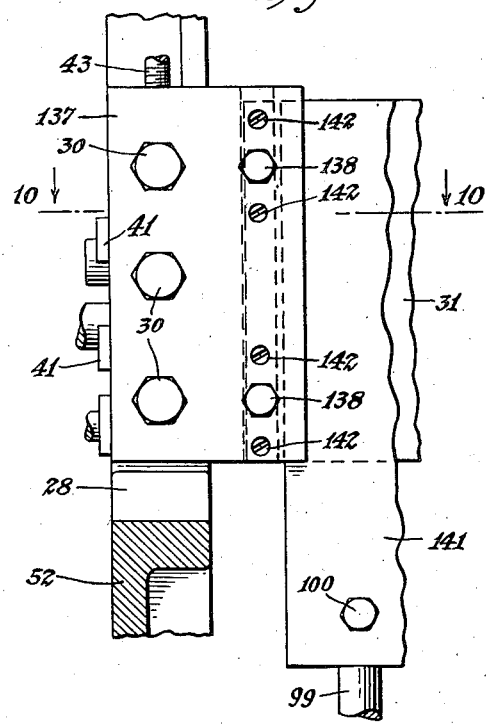

Figs. 9, 10 and 11 are detail views illustrating a modified form of mounting for the fixed breaker bar, providing a clearance adjustment between it and the movable breaker bar. Figs. 9 and 11 are plan and elevational views, respectively of this detail, and Fig. 10 is a horizontal sectional view taken on the line 10—10 of Fig. 11.

Figure 12:
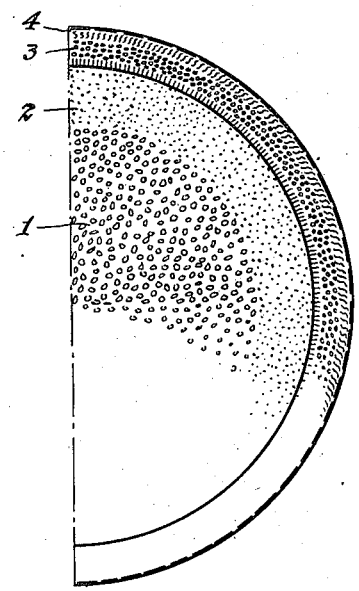

Fig. 12 is a greatly enlarged cross-section of a ramie stalk.

The present invention is applicable to the decorticating of the stalks of many varieties of bast fiber plants. Among these may be mentioned hemp (Cannabis sativa), jute, flax, caroja, kenaf, and kendyr. Generally speaking it is probably applicable to all bast fiber plants as distinguished from the agaves which have the fiber in the center of the leaf instead of in or adjacent the bark of the stalk. I have found it to be particularly effective in the treatment of ramie and hemp. In view of the problem which has existed in connection with the establishment of a profitable ramie industry in this country, and which apparently has its crux in the provision of some inexpensive mechanical decorticating operation, I shall describe the invention with particular reference to processing of the ramie.

The name ramie as used herein and in the appended claims is intended to include the various members of the family Urticacae, of which the two principal species are *Boehmeria nivea* or *Urtica nivea* which has a white under-leaf, and *Urtica utilis*, which has a green under-leaf. The Urtica is the more important plant, and is the one which would be expected to form the backbone of the ramie industry in this country. A cross-section of a ramie stalk, greatly enlarged, is shown in Fig. 12. The stalk comprises a pith center 1 surrounded by a layer of woody (fibro vascular) tissues 2, which in turn is covered by bundles of fibers 3, lying just beneath the bark 4. The fibers 3, which are of pericyclic origin, are cemented together by resins and pectin-like gums.

The problem to which the present invention is directed is the removal of the fibers at low cost, yet without serious damage to the fibers. I have found that this can be accomplished most effectively by following a sequence of operations which comprise: first, crushing the stalks under high pressure between smooth-surfaced rolls to elongate the woody center portion and strip, or partially strip, it from the fiber and the bark to which the fiber is attached; second, bending the stalk first in one direction and then in another to break up the woody portion without breaking or weakening the fiber; third, beating or combing out the woody fragments or "hurd"; and fourth, removing the bark from the fibers and softening the latter by passing the remainder of the stalk through fluted or grooved rolls under relatively low pressure. An important feature of this method resides in stripping or loosening the woody portion of the stalk from the bark and fibers before any substantial bending, or sharp bending, of the fibers takes place. Another feature resides in substantially entirely removing the woody matter before completing separation of the fibers from the bark. Still another feature resides in pulling the ends of the stalks through the bending means in such a manner as to effect complete decortication of the entire length of stalk.

With reference to Figs. 1-7 of the drawings I shall now describe a preferred form of apparatus for carrying out my novel method. The several units for carrying out the four principal steps described are indicated generally by the reference characters 5, 6, 7 and 8 in Fig. 1. In each case the arrow from the reference character points to the center-line of the unit. Crushing is performed by the roll stand 5, bending by the "breaker" bar unit 6, beating to remove the hurd by the beater 7, and bark removal and softening by the group of roll stands 8. The preferred construction of these several units and of the cooperating guides, feed rolls, and other mechanism will now be described.

The operating units are carried by a pair of frame members 9, and a second pair of frame members 10 may be provided to support the end of a conveyor to carry away the separated fibers. The frame members 9 and 10 are tied together in any convenient manner, as by means of tie rods 11. If desired, the various frame members may be mounted on a base plate or truck chassis for ease of transportation from one point of operation to another.

Mounted on the frame members 9 are the frames 12 of roll stand 5, provided with vertical guides or ways 13 (Fig. 3) in which are slidably mounted bearing blocks 14 for the axles 15 of the rolls 16. The pressure on the stalks passing through the rolls 16 is regulated by a pair of screw-downs 17 which vary the compression of the springs 18 bearing against the upper pair of bearing blocks 14.

The frames 12 are provided with lugs 19 to support the guide plate 20 which is provided with depending lugs for attachment to the supporting lugs 19 by the studs 21. The guide plate 21 may be flanged, as at 22, to provide a connection to the feed table 23 which rests at one end on the angle 24 attached to the flange 22 by cap screws 25. The feed table 23 is provided with guide rails 26 along each side thereof, and with a series of guide members 27 evenly spaced across its width. The guides 27 preferably consist of inverted U-shaped wire staples arranged as indicated in Figs. 1 and 2, and presenting no sharp edges or corners to catch the stalks. With this arrangement the stalks, when thrown on the table and spread across it, drop into the spaces between the guides 27, forming an even layer of well separated stalks. This prevents too great a thickness of stalks at the slots of the breaker bars to be described.

Figure 5:
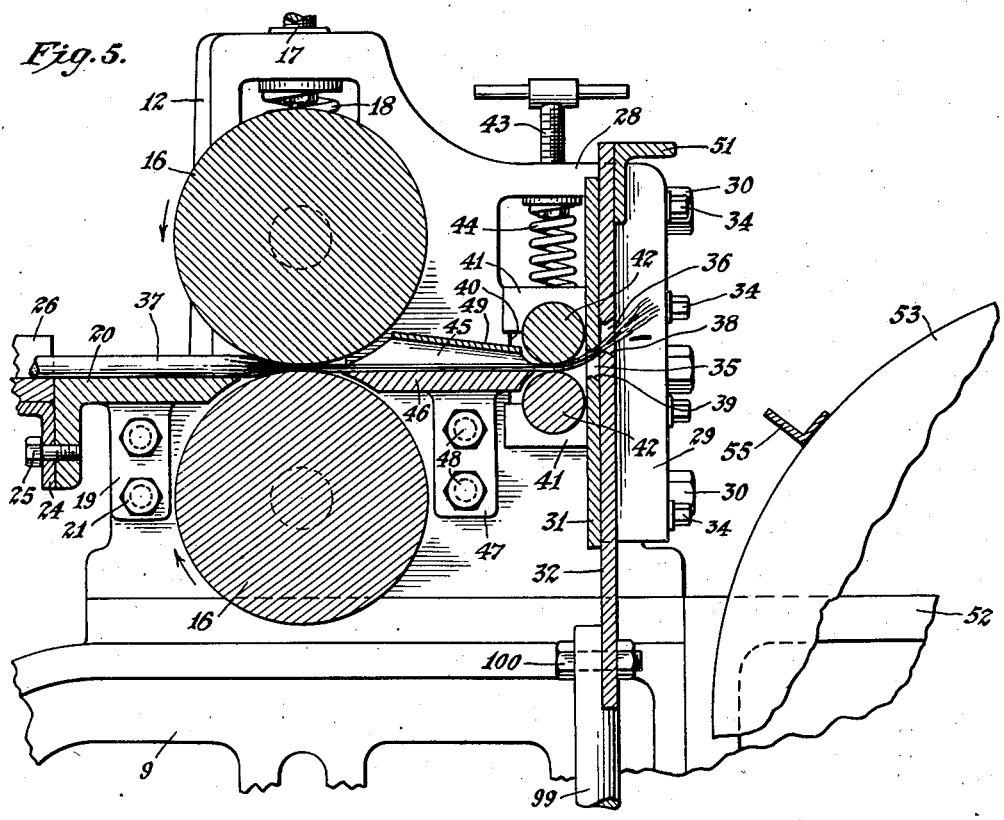

An extension 28 formed as a part of each of the frames 12 provide supports for the breaker bar unit 6 and for the associated trumpet guide and feed rolls. To the edges of the extensions 28 are secured brackets 29 by means of cap screws 30. Portions of the brackets 29 project upwardly of the frames 12 to form supports for the fixed breaker bar or plate 31 and guides for the movable breaker bar or plate 32. For the latter purpose, the brackets 29 are notched at 33 (Fig. 4), providing guiding channels between the fixed breaker bar 31 and portions of the brackets 29. The fixed breaker bar 31 is secured to the brackets 29 by means of bolts 34, or in any other convenient manner. The breaker bars 31 and 32 are provided with slots 35 and 36, respectively, extending laterally of the machine. The slot 36 in the movable breaker bar lies opposite the slot 35 in the fixed breaker bar when the former is at the center of its travel. The form of the slots 35 and 36 is best shown in Fig. 5. It will be observed that these slots are rounded, or tapered, in the direction of travel of the stalks 37. The surfaces 38, 39, which form the taper toward the exit sides of the slots, are of greater extent than the rounded, or tapered, surfaces at the entry sides thereof. When the breaker bars are in the position shown in Fig. 5 the crushed stalks are bent upwardly by the movable breaker bar 32 which brings the bent portions of the stalks against the upper tapered surface 39 of the fixed breaker bar 31. Similarly, when the breaker bar 32 moves downwardly the stalks are bent downwardly against the lower tapered surface 39 of the breaker bar 31. Thus the stalks are bent first in one direction and then in another in a manner which breaks up and further loosens the woody portions of the stalks without cutting or injuring the fiber to any extent. In Fig. 5, the breaker bar 32 is shown at the limit of its upward travel. At the limit of its downward travel, the center-line of the slot 36 will be separated vertically from the center-line of the slot 35 by a distance which is equal in extent but opposite in direction to that shown in Fig. 5. The top edge of the breaker bar 32 may be reinforced with an angle-iron brace 51 which terminates short of the brackets 29.

The extensions 28 of the brackets 12 are provided with guides, or ways, 40 to receive slidably the bearing blocks 41 for feed rolls 42 which may be surfaced with rubber or other resilient material to firmly grip the stalks without injuring the fibers. These rolls 42 should be located as close as possible to the breaker bar 31, and are of relatively small diameter in order to bring their center-lines in proximity to the slot 35. The proximity of these rolls to the breaker bar 31 has the advantage of feeding the stalks all the way through the breaker bars while holding them firmly up to the very end thus insuring complete decortication of the entire length of stalk. Screw-downs 43 in conjunction with compression springs 44, bearing against the upper bearing block 41, provide means for resiliently regulating the pressure between the rolls 42. To assist in guiding the stalks between the crushing rolls 16 and feed rolls 42, it is preferable to employ a guide "trumpet" 45. As shown, this consists of a table 46 having depending lugs 47 at either end for attachment to the brackets 12, as by means of screws or bolts 48. At its ends, the table is provided with upstanding flanges to which a cover plate 49 is removably attached, as by means of screws 50 (Figs. 2 and 3).

The beater unit 7 and bark removal unit 8 may conveniently be carried by brackets or extensions 52 mounted on the frames 9. The beater unit 7 comprises a pair of circular discs 53 mounted on a shaft 54 journaled in the brackets 52, said discs carrying beater bars 55 around their periphery, these bars conveniently being constructed of angle-irons one leg of which is welded to the edges of the discs 53 and the other leg of which extends radially to flay the hurd from the bark and fiber when the beater is rotated.

Figure 6:
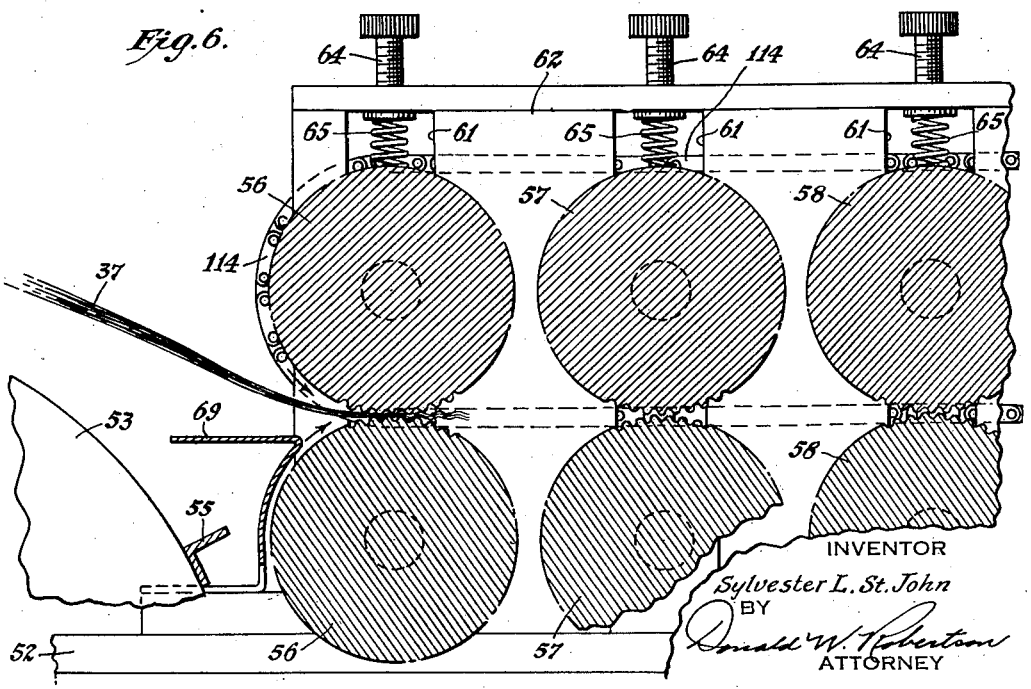
Figure 7:
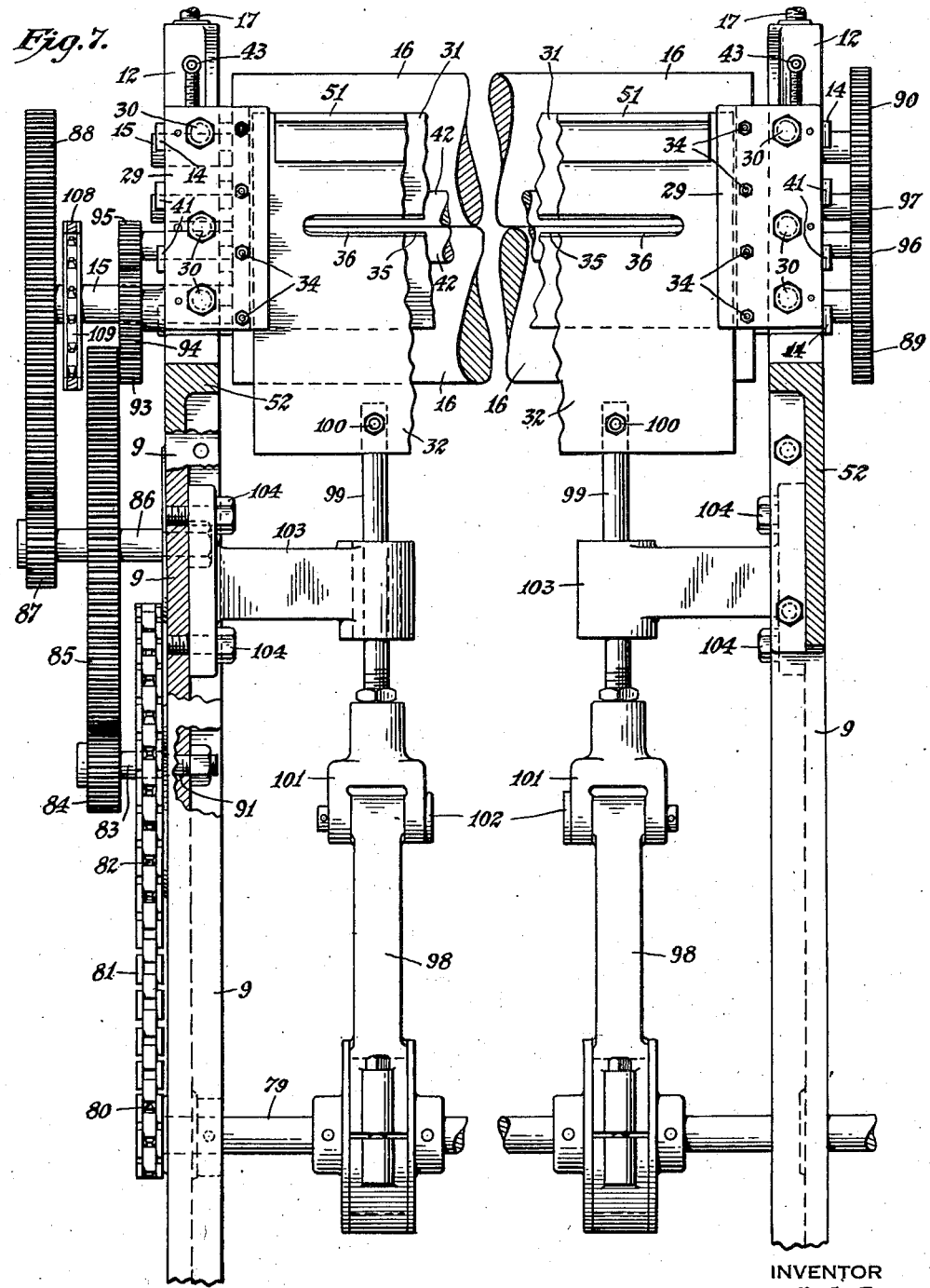
Fig. 7 is an elevational view of the operating mechanism for the rolls and breaker bars, taken as indicated at 7—7 of Fig. 1.

The bark removal and fiber softening unit 8 will be described principally with reference to Figs. 1, 2 and 6. It consists, in its general arrangement, of a plurality of roll stands 56, 57, 58, 59 suitably mounted on the brackets 52 beyond the beater unit 7. The rolls 56, 57, 58 and 59 are grooved or serrated to break the bark away from the fiber. I have found that, once the hurd has been substantially entirely removed from the stalk, such grooved or serrated rolls, operating under relatively low pressure compared to the crushing rolls, do not injure or weaken the fibers to any substantial extent, if at all. I prefer to employ at least four stands of bark removal rolls. The grooves in the rolls should have rounded edges such as would correspond in form to the surface of an ordinary corrugated sheet (see Fig. 6). I have found this unit to be particularly effective if some of the rolls are grooved longitudinally and others spirally. Thus the rolls 56 and 59 are grooved longitudinally, whereas the rolls 57 and 58 are grooved spirally. The spirals of the grooves of the rolls 57 and 58 are equal in pitch but opposite in direction. This arrangement of rolls has the effect of bending the bark both up and down, and from side to side, which is most effective in separating the bark from the fiber. The axles of the rolls are carried in bearing blocks 60 slidably mounted in ways 61 formed in frames 62 secured to the brackets 52 by screws or bolts 63. Screw-downs 64 having threaded engagements with the frames 62, or with members associated therewith, regulate the compression of coil springs 65 bearing against the upper pairs of bearing blocks 60. The roll passes are regulated by adjustable stop members 66 (Fig. 1) which may have a screw-threaded engagement with one of each set of opposed bearing blocks and abut the other block of the set, as at 67. The stops 66 may be provided with lock-nuts 68 to hold them in adjusted position. Guide members 69 and 70 are mounted on the bases of the frames 62, guide 69 directing the stock from the beater into the first roll stand 56, and guide 70 directing the stock from the last roll stand 59 onto a conveyor belt 71. The conveyor belt 71 runs over a roller 72 journaled in brackets 73 secured to the frames 10.

Having described the various operating units of my machine, I shall now describe the driving mechanism therefor, although it should be understood that I do not limit myself to the particular driving means shown, these means being disclosed merely by way of illustration. A motor 74 is mounted on a base plate 75 which may conveniently be secured to the tie rods 11 of the frames 9. The pulley 76 of this motor drives a pulley 77 through a belt 78. The pulley 77 is keyed to a main shaft 79 journaled in the frames 9. The crushing rolls 16 are driven from the main shaft 79 as follows: from sprocket 80 keyed to main shaft 79, to sprocket chain 81, to sprocket 82 keyed to shaft 83; from pinion 84 keyed to shaft 83 to gear 85 keyed to shaft 86; from pinion 87 keyed to shaft 86 to gear 88 keyed to shaft of the lower crushing roll 16. The upper crushing roll is driven from the lower crushing roll by gear 89 and 90 secured to the roll shafts at the opposite side of the machine. The shafts 83 for the sprockets and gears 82 and 84 may be adjustable in order to permit gear changes for varying the speed of the crushing rolls as may be desired for processing different plants or stalks of different size or decorticating characteristics. For this purpose I mount the shaft 83 in arcuate slots 91 (Fig. 1), having the axis of the shaft 79 for a center. This permits changes in the center-to-center distance between shafts 83 and 86 to accommodate different gear sizes. The lower feed roll 42 is driven from the shaft 15 of the lower crushing roll 16 through a gear 93 keyed to said shaft, idler gear 94, and pinion 95 keyed to the shaft of the lower feed roll 42. The upper feed roll is driven from the lower feed roll through pinions 96 and 97 keyed to the feed roll shafts at the opposite side of the machine.

The movable breaker bar 32 is driven from the main shaft 79 through eccentric straps 98 cooperating with eccentric cams keyed to the shaft 79. The eccentric straps 98 are connected to the breaker bar 32 by rods 99, bolted to the bar at 100, and having a clevis 101 secured to the lower end thereof to pivotally receive the ends of the strap 98. The strap and clevis are joined by a pivot pin 102. The rods 99 are guided in brackets 103 secured to the frames 9 by screws or bolts 104. The eccentric mechanism imparts a rapid vertical reciprocation to the breaker bar 32 of the extent previously set forth.

The beater 7 is driven from the main shaft 79 in any suitable manner, as by means of the belt 105 and pulleys 106, 107, secured respectively to the shafts 79 and 54.

The bark removal unit 8 may be driven directly from the crushing roll shaft 15 by a chain and sprocket 108, 109, the chain 108 having a driving engagement with a sprocket 110 keyed to the shaft of the lower roll 56. The upper roll 56 is driven from the shaft of the lower roll 56 by gears 111, 112 keyed to their respective shafts. The succeeding roll stands 57, 58 and 59 are driven from the shafts of the stand 56 by sprockets and chains 113, 114. The chain 113 engages sprockets keyed to the shafts of each of the lower rolls 56, 57, 58 and 59 at one side of the machine; and the chain 114 engages sprockets keyed to the shafts of each of the upper rolls 56, 57, 58, and 59 at the other side of the machine. The sprockets keyed to the shafts of the rolls 57 have one tooth less than the sprocket 110; the sprockets keyed to the shafts of the rolls 58 one tooth less than those for the rolls 57; and the sprockets for the rolls 59 one tooth less than those for the rolls 58. The peripheral speeds of the crushing rolls 16, feed rolls 42, and rolls 56 are substantially the same. However, the feed rolls 42 preferably are adjusted to run at a very slightly greater peripheral speed than the crushing rolls, to take up the elongation of the fiber due to crushing and to insure that there will not be any appreciable amount of slack between these two sets of rolls. The peripheral speeds of the remaining stands of rolls 57, 58, and 59 are progressively higher. This speed differential produces a scraping or stripping action on the bark and removes any hurd remaining after the flailing performed by the rotary beater 7. The clearances between the rolls of the stands 56, 57, 58 and 59, as regulated by the adjustable stops 66, prevent tearing or injury to the fiber.

The peripheral speed should be adjusted in accordance with the size and character of the stalks to be decorticated. In general, the larger the stalk diameter the slower is the optimum speed. I have found that for ramie, speeds ranging from 95 to 125 inches per minute can be employed with good results. Depending on the conditions encountered, the peripheral speeds may be higher or lower than this, however. Hemp can be run through much faster than ramie; jute somewhat slower.

The speed of reciprocation of the breaker bars should be so related to the peripheral speed of the crushing and feed rolls as to flex or bend the stalk (in the case of ramie) at intervals preferably not greater than ⅛ inch apart; that is, not greater than ¼ inch between successive downward bends or between successive upward bends. I have found that when this condition is maintained, the hurd can be advantageously removed by the flailing operation.

The delivery belt 71 is driven from the shaft 54 of the beater unit by a belt 115 engaging pulleys 116 and 117 secured, respectively, to the shaft 54 and shaft 118 of the roller 72 which frictionally engages the belt 71. The roller at the other end of the belt 71 (not shown) may be driven by a belt 119 from a pulley 120 keyed to the shaft 118.

Figure 8:
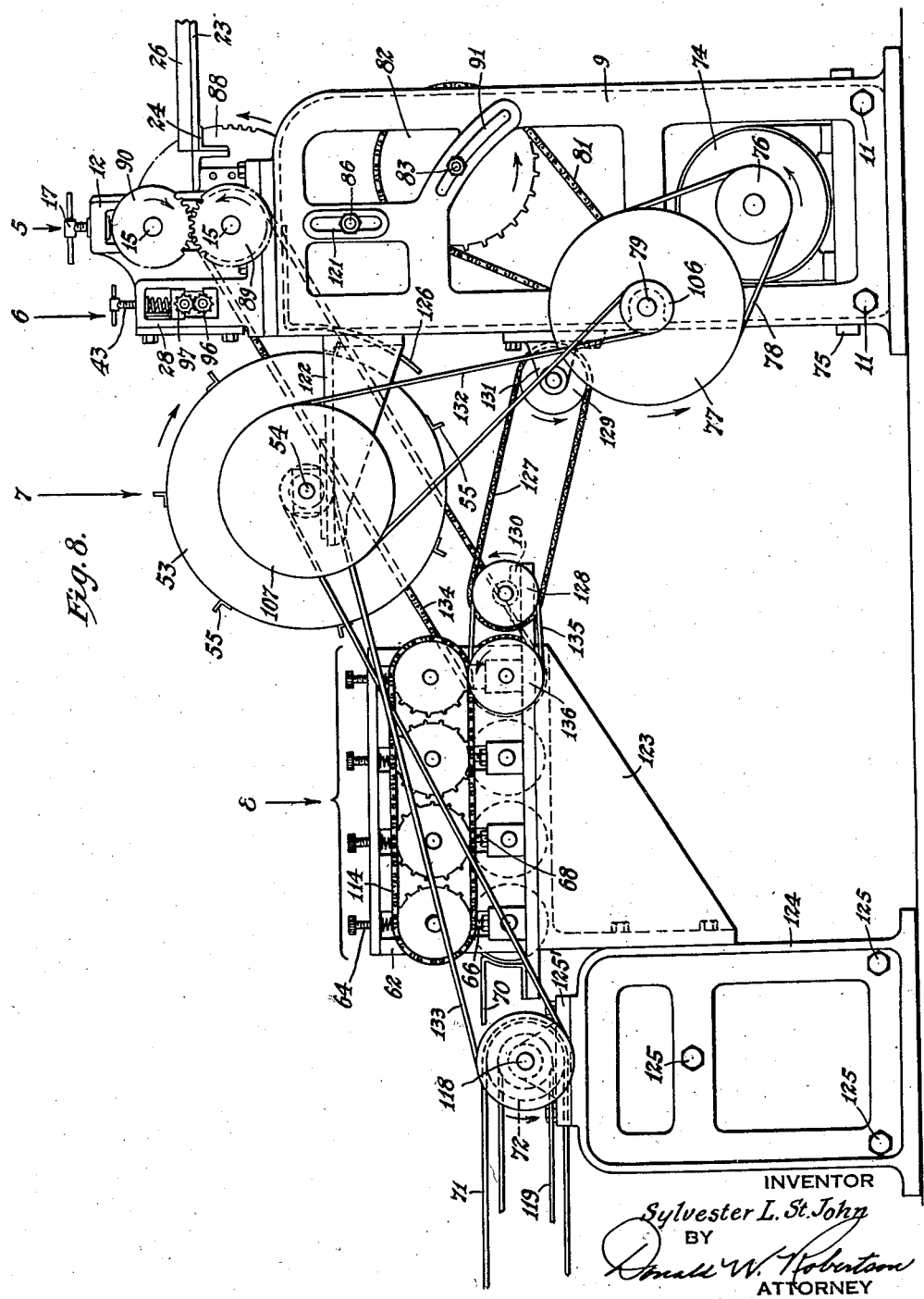
Fig. 8 is a side elevational view of another form of apparatus embodying the invention.

In Fig. 8 I have illustrated another embodiment of apparatus suitable for carrying out my novel method. In this form of apparatus the construction of the various units 5, 6, 7 and 8 may be essentially the same as described with reference to Figs. 1–7 inclusive. Like reference numerals have been placed on the similar parts of the two machines. The principal modification which has been made in the machine shown in Fig. 8 concerns the matter of arranging the various units so that the material is fed below the beater 7 instead of above it. The change in the arrangement can best be seen from comparison of Fig. 1 with Fig. 8. Fig. 8 is taken from the opposite side of the machine and thus shows up more clearly some of the features previously described in connection with Fig. 1, such as the arcuate slot 91. This view also shows a vertical slot 121 which permits a change in the position of the journal for the shaft 86, carrying the gear 85 which is the one designed to be interchanged to modify the speed. It should be observed that the changing of this one gear changes the speed of crushing rolls, feed rolls and the rolls 56, 57, 58 and 59 of the unit 8. In this embodiment the brackets or extensions 52 are replaced by shorter extensions 122 arranged to carry only the beater unit 7. The unit 8 is carried by brackets 123 secured to frame members 124 which take the place of the frame members 10 of the embodiment of Fig. 1. The frame members 124 may be secured together by tie-rods or bolts 125 extending transversely of the machine. The roller 72 supporting and driving the conveyor belt 71 is carried by brackets 125' mounted on the frames 124. The material leaving the breaker bar unit 6 passes downwardly and around the beater 7, being guided by the circumferentially curved element 126 secured to the frames 9. From this point the material passes over a foraminous conveyor belt 127 carried by rollers 128 and 129 journaled, respectively, in brackets 130 and 131 secured, respectively, to the frames 62 of the unit 8 and the frames 9. The belt 127 may be made of wire cloth or other foraminous material such as will permit the hurd fragments to fall therethrough as they descend from the beater 7. The belt 127 is driven from the roller 128 which in turn is driven by a belt 135 passing around a pulley 136 fastened to the shaft of the lower roll 56 of the unit 8.

The driving means for the various units of the embodiment shown in Fig. 8 are the same as have been described with reference to Figs. 1–7 except as now will be noted: The beater 7 is driven from the main shaft 79 as before, but the drive is through a crossed belt 132 so that the direction of rotation of the beater will be reversed. Also, inasmuch as the conveyor belt 71 is driven from the shaft 54 on which the beater 7 is mounted, it becomes necessary to employ a crossed belt 133 in order to maintain the same direction of travel of the conveyor 71. The drive from the crushing unit 5 to the unit 8 remains the same except that the horizontally arranged chain 108 is replaced by the chain 134 extending to the new position of the unit 8. One advantage of the arrangement shown in Fig. 8 is that the hurd drops in the general direction in which it is thrown by the beater 7. That is to say, the beater tends to throw the hurd fragments downwardly, and they are permitted to fall by gravity from the side and bottom of the beater instead of having to find their way downwardly from the top of the beater.

In Figs. 9, 10, and 11 I show a modified mounting and guide for the fixed and movable breaker bars. Fig. 9 is a view similar to a portion of Fig. 4 in which the bracket 29 has been replaced by a bracket 137 secured by bolts or screws 30 to the extensions 28 of the frames 12. The fixed breaker bar 31 is secured to the brackets 137 by bolts 138 which pass through apertures in the brackets and have a threaded engagement with the breaker bar. The brackets 137 are provided with notches of a different form than the notches 33 of the brackets 29. In the modified construction these notches are provided with inclined surfaces 139 for cooperation with correspondingly inclined surfaces 140 of the reciprocable breaker bar 141. This construction affords a lateral guiding support for the bar 141 while permitting a suitable clearance between the bracket and the bar. In order to provide an adjustment for the clearance between the breaker bars 31 and 141, set screws 142 are provided in the brackets 137 so that when the bolts 138 are loosened, the set screws can be advanced to provide the desired amount of clearance at 143. This construction is applicable to the breaker bar unit 8 of both the machine illustrated in Figs. 1–7 and that illustrated in Fig. 8.

Although I have shown the use of only two breaker bars in combination, it will be understood that the number of such bars may be increased if desired. For example, it would be possible to use a plurality of breaker bars with successively wider slots. These breaker bars provide means for bending the crushed stalks of the plants up and down, or back and forth, in such a way as to break up the woody interior portions of the stalk into fragments which are easily removed by the beater 7. It should be observed that this breaking operation is performed without the application of any substantial crushing pressure to the stalk. One of the important features of my invention resides in the flattening or crushing of the stalk without bending it, and thereafter bending it without substantial further crushing. With this sequence of operations, the woody interior portions are loosened or stripped from the bark which contains the fiber before any bending action is performed, thus avoiding the cutting or weakening of the fiber which results from crushing it between grooved or corrugated pressure rolls, and making it possible to produce long-line fiber. When the crushing operation is performed with smooth-surfaced rollers, the stalk is maintained substantially straight up to the zone of maximum pressure. Thereafter, it is bent back and forth without any tendency to break the fiber which, along with the bar, has already been loosened from the woody portion. Having in mind the essential features of my method and apparatus, it will be understood that various modifications can be made while retaining important advantages of my invention. For example, in place of the single machines which I have described specifically, duplex or multiple machines can be employed, thus increasing the width and capacity of the combined machine. Also, the form of the rotary beater is subject to considerable variation while retaining the essential principle of operation thereof. Again, the unit 8 may be designed with a smaller or greater number of roll stands than I have shown in my preferred embodiments. Other modifications will suggest themselves to those concerned with the problems presented in the decortication of bast fiber plants. The embodiments which I have described have been designed with specific reference to the problem of decorticating the *Urtica nivea*. For the decortication of other varieties of bast fiber plants, it may be found desirable to make certain alterations in the proportions and arrangement of the various elements, but the general principle of operation will remain the same. The terms and expressions which I have employed are used as terms of description and not of limitation, and I have no intention of excluding such equivalents of the invention set forth, or of portions thereof, as fall within the purview of the claims.

I claim:

1. Method of decorticating bast fiber plants which comprises applying crushing pressure transversely of the stalk without bending the stalk and before the stalk has been bent sufficiently to produce substantial transverse fractures of the woody portion thereof, and thereafter bending the stalk back and forth in the absence of crushing pressure the crushing pressure being discontinued prior to the bending step.

2. Method of decorticating bast fiber plants which comprises applying crushing pressure to the stalk without bending the stalk and before the stalk has been bent sufficiently to produce substantial transverse fractures of the woody portion thereof, thereafter bending the stalk in the absence of crushing pressure, the crushing pressure being discontinued prior to the bending step, flailing the stalk, and separating the bark from the fiber.

3. Method of decorticating bast fiber plants which comprises applying crushing pressure to the stalk without bending the stalk and before the stalk has been bent sufficiently to produce substantial transverse fractures of the woody portion thereof, thereafter bending the stalk back and forth in the absence of crushing pressure, the crushing pressure being discontinued prior to the bending step, flailing the stalk, and bending the bark and fiber back and forth under pressure.

4. Method of decorticating bast fiber plants which comprises applying crushing pressure to the stalk without bending the stalk and before the stalk has been bent sufficiently to produce substantial transverse fractures of the woody portion thereof, thereafter bending the stalk back and forth in the absence of crushing pressure, the crushing pressure being discontinued prior to the bending step, flailing the stalk, and bending the bark and fiber up and down and from side to side under pressure.

5. Apparatus for decorticating bast fiber plants which comprises smooth-surfaced pressure rolls for crushing the whole stalk without bending it, reciprocatory means independent of the rolls for initially bending the crushed stalk and means for flailing the stalk as it issues from the bending means.

6. Apparatus for decorticating bast fiber plants which comprises means for applying crushing pressure to the straight stalk without bending it, reciprocatory means independent of said pressure applying means for initially bending the crushed stalk and means for flailing the stalk as it issues from the bending means.

7. Apparatus for decorticating bast fiber plants which comprises means for applying crushing pressure to the straight stalk without bending it, reciprocatory means for initially bending the crushed stalk back and forth in the absence of crushing pressure, and means for flailing the stalk as it issues from the bending means.

8. Apparatus for decorticating bast fiber plants which comprises means for applying crushing pressure to the straight stalk without bending it, means for bending the crushed stalk back and forth in the absence of crushing pressure, and means for bending the bark back and forth under pressure to separate the fiber therefrom.

9. Apparatus for decorticating bast fiber plants which comprises means for applying crushing pressure to the straight stalk without bending it, means for bending the crushed stalk back and forth in the absence of crushing pressure, means for flailing the stalk as it issues from the bending means, and means for bending the bark back and forth under pressure to separate the fiber therefrom.

10. Apparatus for decorticating bast fiber plants which comprises smooth-surfaced crushing rolls, rough-surfaced rolls, reciprocatory means therebetween for bending the crushed stalk back and forth, and means for feeding the stalk into the crushing rolls in a straight line and for maintaining it in a straight line until it reaches the reciprocatory means.

11. Apparatus for decorticating bast fiber plants which comprises stalk-crushing means, a pair of plates having openings through which the crushed stalk is arranged to pass, means for reciprocating one of said plates with respect to the other to bend the crushed stalk back and forth, and means for feeding the stalk into the crushing rolls in a substantially straight line and for maintaining it in a straight line until it reaches the plates.

12. Apparatus for decorticating bast fiber plants which comprises a pair of smooth-surfaced crushing rolls, a pair of plates having openings therethrough arranged at the exit side of said rolls, means for producing relative reciprocation of said plates in a direction to vary the alignment of said openings with respect to the pass of the crushing rolls, and means for feeding the stalk into the crushing rolls in a substantially straight line and for maintaining it in a straight line until it reaches the plates.

13. Apparatus for decorticating bast fiber plants which comprises a pair of smooth-surfaced crushing rolls, a pair of plates having openings therethrough arranged at the exit side of said rolls, means for producing relative reciprocation of said plates in a direction to vary the alignment of said openings with respect to the pass of the crushing rolls, and means for feeding the plant stalk in a substantially straight line until it reaches the plates, a rotary beater arranged to receive material passing through said openings, and serrated rolls arranged beyond the beater in position to have the material pass through them.

14. Apparatus for decorticating bast fiber plants which comprises a pair of smooth-surfaced rolls, a pair of serrated or corrugated rolls, a reciprocatory breaker plate arranged between the smooth-surfaced and serrated rolls, and means for feeding the plant stalk into the crushing rolls in a substantially straight line and for maintaining it in a straight line until it reaches the reciprocatory breaker plate.

15. Apparatus for decorticating bast fiber plants which comprises a pair of smooth-surfaced rolls, means for feeding the plant stalks between said rolls without preliminary bending, a pair of serrated or corrugated rolls, and a pair of relatively reciprocable plates arranged between the two pair of rolls, said plates having slots substantially in line with the first roll pass.

16. Apparatus for decorticating bast fiber plants which comprises a pair of smooth-surfaced rolls, means for feeding the plant stalks between said rolls without preliminary bending, a pair of serrated or corrugated rolls, and a pair of relatively reciprocable plates arranged between the two pair of rolls, said plates having slots substantially in line with the first roll pass, said slots being flared outwardly in the direction of travel of the plant stalks therethrough.

17. Apparatus for decorticating bast fiber plants which comprises a feed table having a plurality of guides arranged transversely thereof, a pair of smooth-surfaced crushing rolls, a pair of slotted breaker plates arranged with their slots substantially in line with the exit side of the crushing rolls, a pair of feed rolls between the crushing rolls and breaker plates, a rotary beater at the exit side of the breaker plates and serrated pressure rolls at the exit side of the rotary beater.

18. In apparatus for decorticating bast fiber plants, a feed table having a plurality of guides arranged transversely thereof, said guides formed of rounded wire staples arranged parallel to the direction of travel of the plant stalks over the table.

19. Apparatus for decorticating the bark of bast fiber plants which comprises a pair of longitudinally grooved rolls, a pair of rolls grooved spirally in one direction, a pair of rolls grooved spirally in another direction and arranged adjacent said last-named pair of rolls, and a second pair of longitudinally grooved rolls, said rolls being arranged in sequence so that material passing therethrough is subjected to pressure while being bent up and down and from side to side.

20. Apparatus for decorticating the bark of bast fiber plants which comprises a pair of longitudinally grooved rolls, a pair of rolls grooved spirally in one direction, a pair of rolls grooved spirally in another direction and arranged adjacent said last-named pair of rolls, said rolls being arranged in sequence so that material passing therethrough is subjected to pressure while being bent up and down and from side to side.

21. Apparatus for decorticating bast fiber plants which comprises a pair of smooth-surfaced crushing rolls, a pair of plates having openings therethrough arranged at the exit side of said rolls, means for producing relative reciprocation of said plates in a direction to vary the alignment of said openings with respect to the pass of the crushing rolls, and a pair of feed rolls positioned between the crushing rolls and the plates, said feed rolls being located in close proximity to the plates.

22. Apparatus for decorticating bast fiber plants which comprises a pair of smooth-surfaced crushing rolls, a pair of plates having openings therethrough arranged at the exit side of said rolls, means for producing relative reciprocation of said plates in a direction to vary the alignment of said openings with respect to the pass of the crushing rolls, a pair of feed rolls positioned between the crushing rolls and the plates, said feed rolls being located in close proximity to the plates, and means for flailing the material passing through said openings.

23. Apparatus for decorticating bast fiber plants which comprises a pair of smooth-surfaced crushing rolls, a pair of plates having openings therethrough arranged at the exit side of said rolls, means for producing relative reciprocation of said plates in a direction to vary the alignment of said openings with regard to the pass of the crushing rolls, a pair of feed rolls positioned between the crushing rolls and the plates, and a trumpet guide positioned between the crushing rolls and feed rolls, said trumpet guide terminating in close proximity to the feed rolls.

24. Method of decorticating bast fiber plants which comprises applying pressure progressively longitudinally of the uncrushed plant stalk in a manner to crush the woody portion of the stalk without substantial transverse fracture thereof, and thereafter breaking the woody portion into short lengths and removing substantially all the woody portion without further application of crushing pressure.

25. Method of decorticating bast fiber plants which comprises passing the uncrushed plant stalk in a substantially straight line through smooth-surfaced crushing rolls and continuing to pass the material in a straight line beyond the point where the crushing step is completed, and thereafter breaking the woody portion of the stalk into short lengths and removing substantially all the woody portion.

26. Method of decorticating bast fiber plants which comprises applying pressure progressively longitudinally of the uncrushed plant stalk in a manner to crush the woody portion of the stalk without substantial transverse fracture thereof, and thereafter bending the stalk back and forth to break the woody portion into short lengths and removing substantially all the woody portion without further application of crushing pressure.

27. Method of decorticating bast fiber plants which comprises passing the uncrushed plant stalk in a substantially straight line through smooth-surfaced crushing rolls and continuing to pass the material in a straight line beyond the point where the crushing step is completed, and thereafter bending the stalk back and forth over sharply rounded surfaces to break the woody portion into short lengths and removing substantially all the woody portion.

28. Method of decorticating bast fiber plants which comprises applying pressure progressively longitudinally of the uncrushed plant stalk in a manner to crush the woody portion of the stalk without substantial transverse fracture thereof, thereafter breaking the woody portion into short lengths and removing the fragments by a flailing action, the breaking and flailing steps being performed without further application of crushing pressure.

29. Method of decorticating bast fiber plants which comprises passing the uncrushed plant stalk in a substantially straight line through smooth-surfaced crushing rolls and continuing to pass the material in a straight line beyond the point where the crushing step is completed, thereafter breaking the woody portion of the stalk into short lengths and removing the fragments by a flailing action.

30. Method of decorticating bast fiber plants which comprises applying pressure progressively longitudinally of the plant stalk in a manner to crush the woody portion of the stalk without substantial transverse fracture thereof, thereafter breaking the woody portion into short lengths and removing the fragments by a flailing action, the breaking and flailing steps being performed without further application of crushing pressure, and thereafter separating the bark from the fiber by subjecting the bark and fiber to combined pressure and bending.

31. Method of decorticating bast fiber plants which comprises passing the plant stalk in a substantially straight line through smooth-surfaced crushing rolls and continuing to pass the material in a straight line beyond the point where the crushing step is completed, thereafter breaking the woody portion of the stalk into short lengths and removing the fragments by a flailing action, and thereafter bending the bark to separate it from the fiber.

32. Method of decorticating bast fiber plants which comprises applying pressure progressively longitudinally of the plant stalk in a manner to loosen the woody center portion from the bark and fibers without substantial transverse fracture of the woody portion, thereafter breaking the woody portion into fragments and removing the fragments without further application of crushing pressure, and thereafter subjecting the bark to combined pressure and bending.

33. Method of decorticating bast fiber plants which comprises applying pressure progressively longitudinally of the plant stalk while maintaining the stalk substantially straight from the time the pressure is initially applied until the crushing of the stalk is completed, and thereafter bending the stalk back and forth without further application of crushing pressure to assist in removal of the center portion thereof.

34. Method of decorticating bast fiber plants which comprises applying pressure progressively longitudinally of the uncrushed plant stalk and thereafter bending the stalk back and forth in only one direction at a time and in the absence of crushing pressure.

35. Method of decorticating bast fiber plants which comprises applying pressure progressively longitudinally of the uncrushed plant stalk in a manner to crush the woody portion of the stalk without substantial transverse fracture thereof, and thereafter bending the stalk back and forth in only one direction at a time and in the absence of crushing pressure.

36. Method of decorticating bast fiber plants which comprises applying pressure progressively longitudinally of the plant stalk while maintaining the stalk substantially straight from the time that pressure is initially applied until the crushing of the stalk is completed, and thereafter bending the stalk back and forth but in only one direction at a time.

37. Method of decorticating bast fiber plants which comprises applying pressure progressively longitudinally of the plant stalk while maintaining the stalk substantially straight from the time that pressure is initially applied until the crushing of the stalk is completed, and thereafter bending the stalk first in one direction and then in another while advancing the stalk between each bending operation so that the stalk is bent only once at a given point and so that the leading portion of the bent stalk will always remain free.

SYLVESTER L. ST. JOHN.